United States Patent
Kim et al.

(10) Patent No.: US 10,284,775 B2
(45) Date of Patent: May 7, 2019

(54) ELECTRONIC DEVICE AND METHOD FOR PROCESSING CAPTURED IMAGE ASSOCIATED WITH PREVIEW FRAMES BY ELECTRONIC DEVICE

(71) Applicant: Samsung Electronics Co., Ltd., Gyeonggi-do (KR)

(72) Inventors: Sung-Oh Kim, Gyeonggi-do (KR); Hyun-Hee Park, Seoul (KR); Yong-Man Lee, Gyeonggi-do (KR); Kwang-Young Kim, Gyeonggi-do (KR); Kyeong Lee, Gyeonggi-do (KR); Young-Seol Lee, Seoul (KR); Kwang-Tai Kim, Gyeonggi-do (KR); Soo-Hyung Kim, Gyeonggi-do (KR); Eun-Seok Ryu, Seoul (KR)

(73) Assignee: Samsung Electronics Co., Ltd. (KR)

( * ) Notice: Subject to any disclaimer, the term of this patent is extended or adjusted under 35 U.S.C. 154(b) by 57 days.

(21) Appl. No.: 15/211,577

(22) Filed: Jul. 15, 2016

(65) Prior Publication Data
US 2017/0019604 A1 Jan. 19, 2017

(30) Foreign Application Priority Data
Jul. 15, 2015 (KR) .......................... 10-2015-0100471

(51) Int. Cl.
*H04N 5/222* (2006.01)
*H04N 5/232* (2006.01)
*H04N 1/00* (2006.01)

(52) U.S. Cl.
CPC .......... *H04N 5/23235* (2013.01); *H04N 1/00* (2013.01); *H04N 5/23238* (2013.01); *H04N 5/23245* (2013.01)

(58) Field of Classification Search
CPC .................................................. H04N 5/23235
USPC ................................................... 348/333.05
See application file for complete search history.

(56) References Cited

U.S. PATENT DOCUMENTS

| | | | | |
|---|---|---|---|---|
| 2001/0033303 | A1* | 10/2001 | Anderson | G06F 17/30277 715/854 |
| 2010/0149377 | A1* | 6/2010 | Shintani | H04N 5/232 348/231.5 |
| 2014/0204244 | A1* | 7/2014 | Choi | H04N 5/23222 348/231.99 |
| 2014/0310747 | A1 | 10/2014 | Yi | |

\* cited by examiner

*Primary Examiner* — Usman A Khan
(74) *Attorney, Agent, or Firm* — The Farrell Law Firm, P.C.

(57) ABSTRACT

An electronic device and an operation method by the electronic device are disclosed. The electronic device includes a controller that controls to extract at least one frame of a plurality of preview frames inputted through an image capturing device and store an image captured through the image capturing device according to an image capturing request in association with the selected at least one frame; and a storage unit storing the captured image and the selected at least one frame.

20 Claims, 14 Drawing Sheets
(6 of 14 Drawing Sheet(s) Filed in Color)

ELECTRONIC DEVICE AND METHOD FOR PROCESSING CAPTURED IMAGE ASSOCIATED WITH PREVIEW FRAMES BY ELECTRONIC DEVICE

PRIORITY

This application claims priority under 35 U.S.C. § 119(a) to a Korean Patent Application filed in the Korean Intellectual Property Office on Jul. 15, 2015 and assigned Serial No. 10-2015-0100471, the entire disclosure of which is incorporated herein by reference.

BACKGROUND

1. Field of the Disclosure

The present disclosure generally relates to electronic devices and image processing methods by the electronic devices.

2. Description of the Related Art

Image capturing electronic devices have evolved from film cameras to digital camera-type electronic devices recording images using image sensors.

Electronic devices, such as digital cameras, may convert object images into electrical signals immediately when capturing the images and turn them into digital signals without separate developing or printing and may store them in memories and display the stored images through displays.

In digital cameras, if the camera runs, the preview image of the object may be input through the image sensor and may be immediately displayed through the display even when the image is not captured, and the image may be captured in response to a request for capturing, and the captured image may be stored in the internal storage device.

A digital camera may store a preview image input before capturing in a temporary storage device and may store only captured image in the internal storage device.

However, if the camera of an electronic device stops running, the preview image stored in the temporary storage device is deleted, and thus, it is impossible to use. Those objects included in the captured image cannot give information on the ambient circumstance upon capturing (e.g., at least one of the place captured, ambient environment, other figures not captured, or facility).

SUMMARY

According to an aspect of the present disclosure, there is provided an electronic device and image processing method by the electronic device, in which the electronic device stores a captured image in association with a preview image (a plurality of preview frames) inputted through a camera using the preview image and displays the captured image together with the associated preview frames.

According to an aspect of the present disclosure, an electronic device includes a controller that extracts at least one frame of a plurality of preview frames inputted through an image capturing device interworking with the electronic device and stores an image captured through the image capturing device according to an image capturing request associated with the extracted at least one frame, and a memory that stores the captured image and the extracted at least one frame.

According to an aspect of the present disclosure, a method for processing an image by an electronic device includes extracting at least one preview frame from a plurality of preview frames inputted through an image capturing device interworking with the electronic device, receiving an image captured through the image capturing device according to an image capturing request, and storing the captured image and the extracted at least one preview frame associated with each other.

According to an aspect of the present disclosure, by the electronic device and method for operating the electronic device, the electronic device extracts at least one preview frame from a preview image (a plurality of preview frames) inputted through an image capturing device, stores the extracted at least one frame associated with the captured image, and displays the captured image along with the associated preview frame, allowing information on the ambient circumstance upon image capturing to be identified.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of the present disclosure will be more apparent from the following detailed description when taken in conjunction with the accompanying drawings, in which.

DETAILED DESCRIPTION

Figure 1:
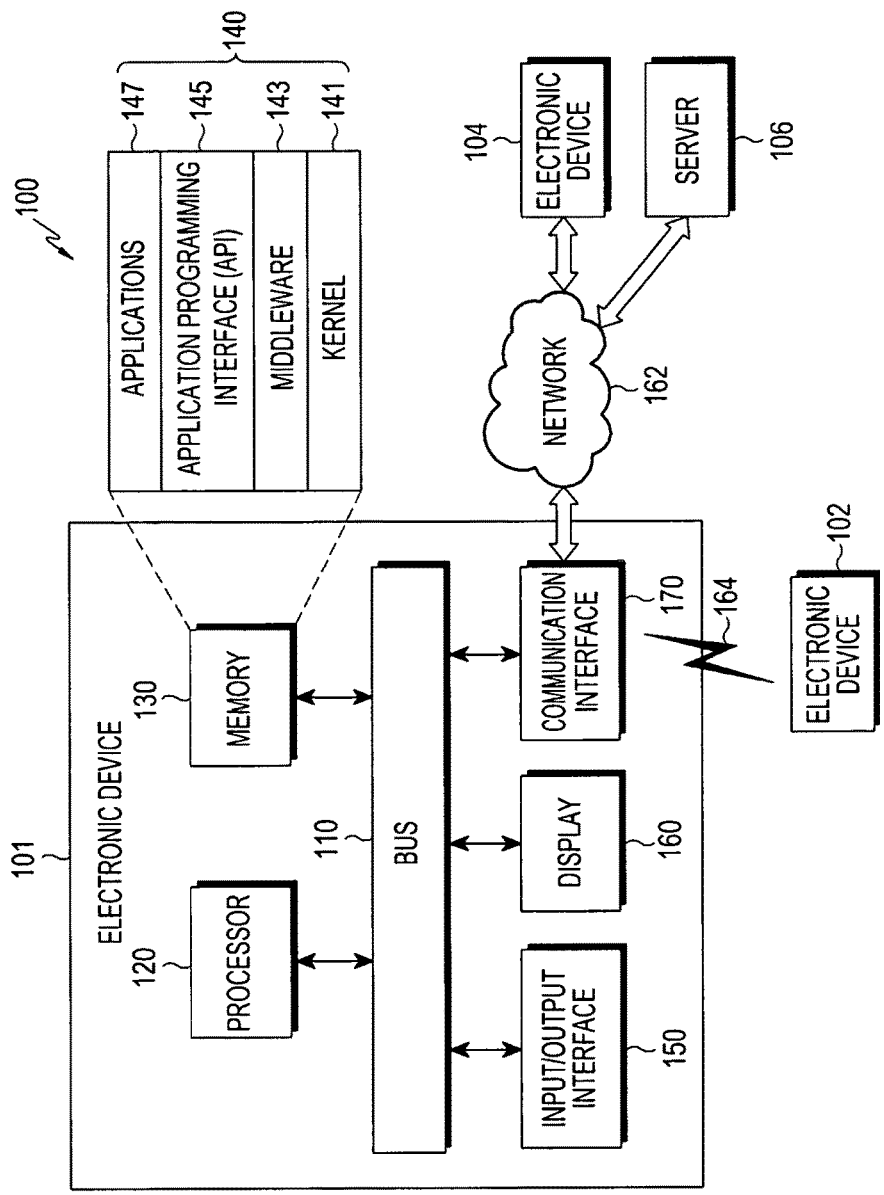
FIG. 1 is a view illustrating a network configuration according to an embodiment of the present disclosure.

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be referred to as a second component, and vice versa, without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the term "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to an embodiment of the present disclosure, the electronic device may be a home appliance. Examples of the home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller machines (ATMs), point of sales (POS) devices, or Internet of Things devices (e.g., a light bulb, various sensors, an electric or gas meter, a sprinkler, a fire alarm, a thermostat, a street light, a toaster, fitness equipment, a hot water tank, a heater, a boiler etc.).

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves). The electronic device may be one or a combination of the above-listed devices. The electronic device may be a flexible electronic device. The electronic device disclosed herein is not limited to the above-listed devices, and may include new electronic devices depending on the development of new technology.

Hereinafter, electronic devices are described with reference to the accompanying drawings, according to various embodiments of the present disclosure. As used herein, the term "user" may denote a human or another device (e.g., an artificial intelligence electronic device) using the electronic device.

Referring to FIG. 1, according to an embodiment of the present disclosure, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components with one another and transferring communications (e.g., control messages and/or data) between the components.

The processor 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or applications) 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or applications 147). The kernel 141 may provide an interface that allows the middleware 143, the API 145, or the applications 147 to access the individual components of the electronic device 101 to control or manage the system resources.

The middleware 143 may function as a relay to allow the API 145 or the applications 147 to communicate data with the kernel 141, for example.

Further, the middleware 143 may process one or more task requests received from the applications 147 in order of priority. For example, the middleware 143 may assign at least one application 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application 147.

The API 145 is an interface allowing the applications 147 to control functions provided from the kernel 141 or the middleware 143. For example, the API 133 may include at least one interface or function (e.g., a command) for filing control, window control, image processing or text control.

The input/output interface 150 may serve as an interface that may transfer commands or data input from a user or other external devices to other component(s) of the electronic device 101. Further, the input/output interface 150 may output commands or data received from other component(s) of the electronic device 101 to the user or the other external device.

The display 160 may include a liquid crystal display (LCD), a light emitting diode (LED) display, an organic light emitting diode (OLED) display, or a microelectromechanical systems (MEMS) display, or an electronic paper display. The display 160 may display various contents (e.g., text, images, videos, icons, or symbols) to the user. The display 160 may include a touchscreen and may receive a touch, gesture, proximity or hovering input using an electronic pen or a body portion of the user.

For example, the communication interface 170 may set up communication between the electronic device 101 and an external device (e.g., a first electronic device 102, a second electronic device 104, or a server 106). For example, the communication interface 170 may be connected with a network 162 through wireless communication or wired communication and may communicate with an external device.

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication 164. The short-range communication 164 may include at least one of wireless fidelity (Wi-Fi), Bluetooth (BT), near-field communication (NFC), or global navigation satellite system (GNSS). The GNSS may include at least one of, e.g., global positioning system (GPS), global navigation satellite system (Glonass), Beidou navigation satellite system (Beidou) or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices 102, 104, or server 106. According to an embodiment of the present disclosure, when the electronic device 101 should perform some function or service automatically or at a request, the electronic device 101, instead of executing the function or service on its own or additionally, may request another external device to perform at least some functions associated therewith. The other electronic device may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
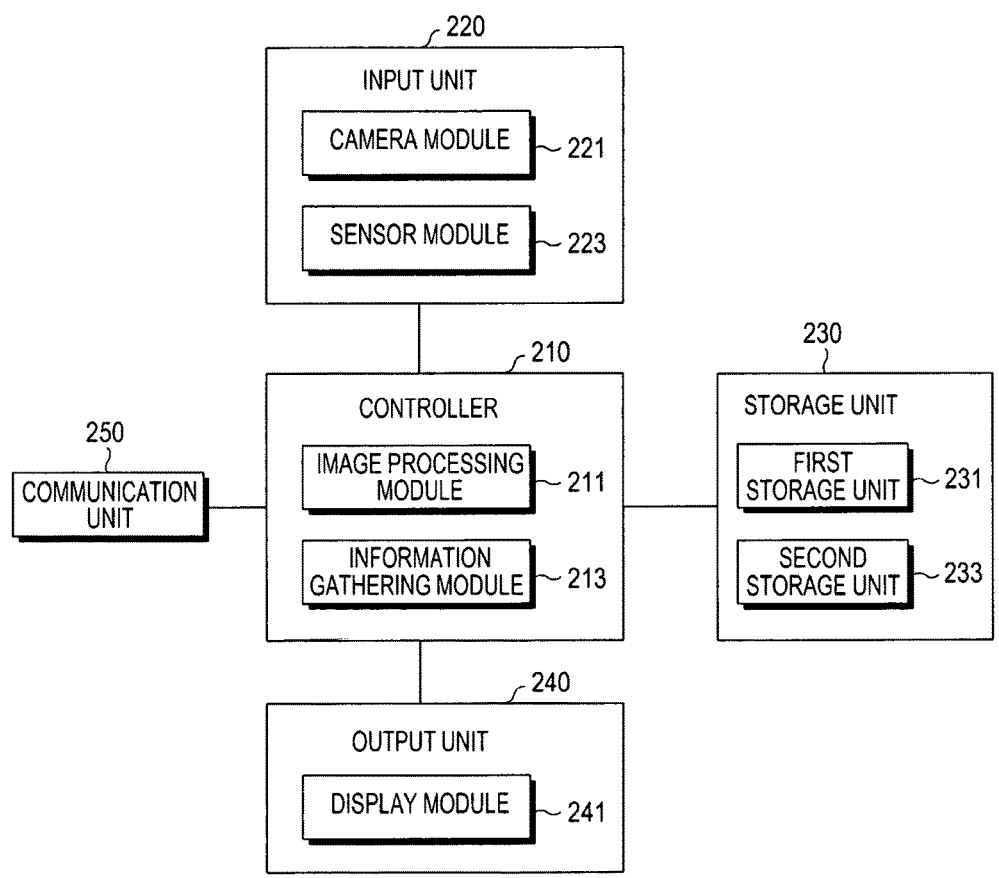
FIG. 2 is a block diagram illustrating a configuration of an electronic device according to an embodiment of the present disclosure.

FIG. 2 is a block diagram illustrating a configuration of an electronic device according to an embodiment of the present disclosure.

Referring to FIG. 2, the electronic device (e.g., the electronic device 101 of FIG. 1) may include at least one of a controller 210, an input unit 220, a storage unit 230, an output unit 240, and a communication unit 250.

According to an embodiment of the present disclosure, the controller 210 (e.g., the processor 120 of FIG. 1) may process information according to an operation of the electronic device or information according to execution of an application, or a function, and the controller 210 may perform control to display the information by running the application on the display module 241 or output the processed information through an audio module. Further, the controller 210 may interwork with an external image capturing device or external display device via the communication unit 250.

According to an embodiment of the present disclosure, the controller 210 may perform an operation of processing a plurality of preview frames inputted through an image capturing device (e.g., the internal camera module 221 or an external image capturing device) before capturing an image (e.g., at least one of a still image, a panoramic image, or motion image). Further, the controller 210 may perform an operation of processing an image captured through an image capturing device (camera module 221) in an image capturing mode state according to an image capturing request.

According to an embodiment of the present disclosure, the controller may include an image processing module 211 and an information gathering module 213. The image processing module 211 of the controller 210 may perform an operation of processing an image to be displayed on the display module 241 of the electronic device or an external display device and performing control so that the processed image may be displayed on the display module 241 or the external display device. The image processing module 211 may perform control so that a plurality of preview frames inputted through the camera are displayed on the display module 241 and perform control to select at least one preview frame (e.g., a key frame) of the plurality of preview frames and display the selected preview frame along with the captured image. Further, the image processing module 211 may perform control to temporarily store the plurality of preview frames transferred from the information gathering module 213 and process at least one preview frame selected from among the plurality of preview frames using sensor information transferred from the information gathering module 213 to generate an image (e.g., a thumbnail image) associated with the captured image. The information gathering module 213 of the controller 210 may gather sensor information (e.g., motion related information) sensed through the sensor module 223 including various sensors provided in the electronic device and gather the plurality of preview frames inputted through the camera module 221 and transfer to the image processing module 211.

Further, according to an embodiment of the present disclosure, the controller 210 may select at least one frame from among a plurality of preview frames inputted through the camera for image capturing included in the camera module 221 and temporarily store the selected at least one frame. Further, the controller 210 may perform control to switch from a preview mode to an image capturing mode according to an image capturing request, capture a frame inputted through the camera in the image capturing mode to generate a captured image, and store the generated captured image in the storage unit 230 in association with the selected at least one preview frame.

According to an embodiment of the present disclosure, the controller 210 may perform control so that the image captured by the camera, together with the at least one preview frame selected from among the plurality of preview frames, may be displayed on the display module 241. The controller 210 may display the at least one preview frame stored in the storage unit 230 associated with the captured image, along with the captured image, on an area of the screen where the captured image is displayed.

According to an embodiment of the present disclosure, when an image is captured by the camera, the controller 210 may generate at least one preview frame selected from the plurality of preview frames temporarily stored as a thumbnail image (e.g., at least one of a still image, video image, and panoramic image of thumbnail type). The controller 210 may perform control so that the generated thumbnail image may be temporarily stored, and when image capturing is initiated in the image capturing mode, the controller 210 may permanently store the captured image associated with the temporarily stored thumbnail image. Further, when an image is captured in the image capturing mode, the controller 210 may permanently store at least one selected preview frame together with the captured image, and when the captured image is requested to be displayed, may generate at least one preview frame stored in association with the captured image as a thumbnail image. Further, the controller 210 may display the generated thumbnail image along with the captured image requested to be displayed.

According to an embodiment of the present disclosure, the controller 210 may receive motion-related information (e.g., at least one of a motion speed, motion direction, or motion angle) obtained by sensing a motion of the electronic device from the sensor module 223 while a plurality of preview frames are inputted in the preview mode. Further, the controller 210 may determine the display type of at least one preview frame stored in association with the captured image based on the received motion-related information and perform control to display at least one preview frame according to the determined display type.

According to an embodiment of the present disclosure, the controller 210 may identify the motion speed, when the identified motion speed is less than a preset value, match the plurality of preview frames selected until reception of the captured image, i.e., until switching to the image capturing mode, to generate the matched preview frames as a panoramic-type preview image (e.g., a thumbnail panoramic image), and perform control so that the generated panoramic preview image may be displayed along with the captured image. Further, when the motion speed of the electronic device is greater than or equal to a preset value, the controller 210 may generate at least one preview frame selected until the captured image is received, i.e., switching to the image capturing mode, as a still or video-type preview image (e.g., at least one of the thumbnail image or thumbnail video image) and perform control so that the generated preview image may be displayed along with the captured image. Further, the controller 210 may select at least one preview frame inputted at the time when the angle is varied as the motion angle of the electronic device varies and generate the selected at least one preview frame as a still or video-type preview image (e.g., at least one of a thumbnail still image or thumbnail video image). The controller 210 may perform control so that the captured image may be displayed along with the preview image generated in different compositions as the motion angle varies. Further, when the user selects one of images generated as different image compositions displayed, the controller 210 may perform control to change the selected preview image (e.g., a thumbnail image) into the original resolution and display it in the form of the captured image. The controller 210 may correct the selected preview image into the original resolution in a super resolution detail scheme using the edge information (information of an edge (E) field) including detail information on the original image (raw image) for the selected preview image. The controller 210 may perform control to change the composition of the captured image based on the corrected image and display the same.

According to an embodiment of the present disclosure, the controller 210 may select at least one preview frame associated with the captured image among the plurality of inputted preview frames according to at least one of a variation in the motion of the electronic device (e.g., at least one a variation in the motion speed, variation in the motion direction, or variation in the motion angle), a variation in binary large object (BLOB), or a variation in the processing information between the plurality of preview frames (e.g., at least one of a variation in brightness, variation in the object in the frame, or variation in information (B field information) of each block in a block (B) field). The controller 210 may compare blocks in a previously inputted preview frame with blocks in the currently inputted preview frame utilizing the B field where a frame is divided into multiple blocks, and when the number of blocks showing a difference is not less than a preset value, may select the currently inputted preview frame as a frame associated with the captured image. Further, the controller 210 may select the preview frame inputted at a preset time period as the frame associated with the captured image.

According to an embodiment of the present disclosure, the controller 210 of the electronic device may be a part of the processor and may include a combination of one or more of hardware, software, or firmware. The controller 210 may lack at least some of the components or may include other components for performing an image processing operation in addition to the components.

According to an embodiment of the present disclosure, when implemented in hardware, the configuration of at least a portion of the controller 210 may include some of at least one processor including a central processing unit (CPU)/micro processing unit (MPU), a memory (e.g., a register and/or random access memory (RAM)) where at least one piece of memory loading data is loaded, and a bus for inputting/outputting at least one piece of data to the processor and memory. When implemented in software, the controller 210 may include a predetermined program routine or program data that is loaded from a predetermined recording medium to a memory to perform a defined function on the electronic device and is processed by the processor.

According to an embodiment of the present disclosure, the input unit 220 (e.g., the input/output interface 150 of FIG. 1) of the electronic device may transfer, to the controller 210, various information, such as number and character information entered from the user and signals entered in relation with setting various functions and controlling functions by the electronic device. The input unit 220 may support a user input for running an application supporting a particular function. The input unit 220 may include at least one of a key input means, such as a keyboard or keypad, a touch input means, such as a touch sensor or touchpad, a sound source input means, a camera module 221 including a camera, or a sensor module 223 including various sensors, and the input unit 220 may include a gesture input means. Further, the input unit 220 may include all types of input means that are being currently in development or are to be developed in the future. The input unit 220 may receive, from the user, information entered by the user through the touch panel of the display module 241 of the output unit 240 or the camera module 221 and may transfer the received information to the controller 220.

According to an embodiment of the present disclosure, the camera module 221 of the input unit 220 may transfer a plurality of preview frames inputted through the camera to the controller 210 and may transfer an image captured after the image capturing mode switch to the controller 210.

According to an embodiment of the present disclosure, the sensor module 223 of the input unit 220 may transfer motion-related information of the electronic device inputted through various sensors of the electronic device to the controller 210. The sensor module 223 may include at least one of a sensor hub or various sensors (e.g., barometer sensor, hall effect IC sensor, light sensor, gyro sensor, heart rate sensor, accelerator sensor, or camera sensor).

According to an embodiment of the present disclosure, the storage unit 230 (e.g., the memory 130 of FIG. 1) of the electronic device may temporarily store various data generated while the program runs, as well as a program necessary for a functional operation. The storage unit 230 may largely include a program area and a data area. The program area may store relevant information for driving the electronic device, such as operating system (OS) for booting up the electronic device. The data area may store data communicated and generated. Further, the storage unit 230 may include at least one storage medium of a flash memory, a hard disk, a multimedia card, a micro-type memory (e.g., a secure digital (SD) or an extreme digital (xD) memory), a random access memory (RAM), or a read only memory (ROM).

According to an embodiment of the present disclosure, the storage unit 230 may include a first storage unit 231, which is a volatile temporary memory device (e.g., a ring buffer), and a second storage unit 233, which is a non-volatile main memory device.

The first storage unit 231 of the storage unit 230 may temporarily store a plurality of preview frames inputted through the camera under the control of the controller 210. The first storage unit 231 may be configured in the form of a ring buffer that discards the preview frame first inputted to the first storage area, e.g., when a new preview frame is inputted. Further, the first storage unit 231 may temporarily store in a second storage area at least one preview frame (e.g., a key frame) selected from among the plurality of preview frames stored in the first storage area. Further, the first storage unit 231 may temporarily store the thumb image of at least one preview frame selected from a plurality of preview frames.

The second storage unit 233 of the storage unit 230 is a non-volatile main memory device capable of storing images captured by the camera under the control of the controller 210. According to an embodiment of the present disclosure, the second storage unit 233 may store the captured image in a first area, store in a second area at least one selected preview frame associated with the captured image or a thumb image for the selected preview frame, and store together association information for association with the captured image. The second storage unit 233 may store in a storage area the captured image and the selected preview frame or thumb image for the selected preview frame in association with each other.

According to an embodiment of the present disclosure, the storage unit 230 may lack at least some of the components or may include other components for storing information and images in addition to the components.

According to an embodiment of the present disclosure, the output unit 240 (e.g., a partial configuration of the input/output interface 150 or display 160 of FIG. 1) of the electronic device may output information on a result of running an operation (e.g., at least one of text, image, video, or sound) under the control of the controller 511. Further, the output unit 240 may include the display module 241 or an audio module.

The display module 241 may display, on the display screen, an input pad (e.g., a button) for entering at least one of various numbers, characters, or symbols on an input window, in various manners. The display module 241 may display a screen of running a service according to the execution of various applications related to information communication. Further, the display module 241 may display at least one of the captured image or a plurality of preview frames inputted through the camera. According to an embodiment of the present disclosure, when running, for example, an image display application so that the user selects one of captured images from an album, the display module 241, if there is a preview frame stored in association with the selected captured image, may display the associated preview frame (or thumb image) together with the selected captured image on the display screen.

Further, according to an embodiment of the present disclosure, when the display module 24 of the electronic device is implemented as a touchscreen, the input unit and/or display module 241 may correspond to the touchscreen. The display module 241, when implemented together with the input unit 220 in the form of a touchscreen, may display various information generated according to the user's touch operation.

According to an embodiment of the present disclosure, the display module 241 of the electronic device may include at least one or more of an LCD, a thin film transistor LCD (TFT-LCD), an OLED display, an LED display, an active matrix OLED (AMOLED) display, a flexible display, and a three-dimensional (3D) display. Some of the displays may be configured in a transparent type or light-transmissive type allowing the outside to be viewed therethrough. This may be configured in the form of a transparent display including a transparent organic light emitting diode (TOLED).

According to an embodiment of the present disclosure, the audio module of the output unit 240 may include at least one of, e.g., an audio codec, a microphone (MIC), a receiver, an earphone output (EAR_L) or speaker.

According to an embodiment of the present disclosure, the output unit 240 may lack at least some of the components or may include other components for outputting information and images in addition to the components.

According to an embodiment of the present disclosure, the communication unit 250 of the electronic device (e.g., the communication interface 170 of FIG. 1) may perform communication with other electronic devices or external electronic devices under the control of the controller 210. The communication unit 210 may communicate data related to an operation run under the control of the controller 210 with an external device. The communication unit 250 may connect to a network through wireless communication or wired communication via the communication interface or perform communication through inter-device connection. The wireless connection may be made by various radio communication protocols, including, but not limited to, Wi-Fi, BT, NFC, GPS, or cellular communication protocols (e.g., LTE, LTE-A, CDMA, WCDMA, UMTS, WiBro or GSM. The wired connection may be made by various wired communication protocols, including, but not limited to, universal serial bus (USB), high definition multimedia interface (HDMI), recommended standard 232 (RS-232), or plain old telephone service (POTS). The communication unit may include all other types of communication schemes that have been widely known or are to be developed in the future, in addition to the above-enumerated communication schemes.

According to an embodiment of the present disclosure, the communication unit 250 may transmit together the information on at least preview frame (or thumb image) associated with the captured image upon transmission of the captured image to another electronic device.

Major components of the electronic device have been described above in connection with FIG. 2. However, the components shown in FIG. 2 are not essential components, and the electronic device may be implemented with more or less components than those shown. The position of the major components described above in connection with FIG. 2 may be varied according to various embodiments of the present disclosure.

According to an embodiment of the present disclosure, an electronic device may include a controller performing control to extract at least one frame of a plurality of preview frames inputted through an image capturing device interworking with the electronic device and store an image captured through the image capturing device according to an image capturing request in association with the selected at least one frame and a storage unit storing the captured image and the selected at least one frame.

According to an embodiment of the present disclosure, the controller may perform control so that the captured image together with the selected at least one frame is displayed on a display.

According to an embodiment of the present disclosure, the controller may perform control to temporarily store the plurality of preview frames in a temporary memory device of the storage unit and store the selected at least one frame associated with the captured image, together with the captured image, in a main memory device of the storage unit.

According to an embodiment of the present disclosure, the controller may perform control to generate the selected at least one frame as a thumb image and display the generated thumb image along with the captured image.

According to an embodiment of the present disclosure, the controller may perform control to receive motion-related information of sensing a motion of the electronic device while the preview frames are inputted and display the selected at least one preview frame along with the captured image based on the received motion-related information.

According to an embodiment of the present disclosure, the controller may perform control to identify a motion speed of the electronic device, when the identified motion speed is smaller than a set value, match a plurality of preview frames selected from the plurality of preview frames and display the matched preview frames as a panorama-type preview image.

According to an embodiment of the present disclosure, the controller may perform control to identify a motion speed of the electronic device, and when the identified motion speed is not less than a set value, display at least one preview frame selected from the plurality of preview frames as a preview image of at least one type of a still image or a video image.

According to an embodiment of the present disclosure, the controller may perform control to select at least one preview frame whenever a motion angle of the electronic device is varied not less than a set angle and display a plurality of frames selected until before the captured image is received as preview images of different compositions.

According to an embodiment of the present disclosure, the controller may perform control to, when at least one preview image is selected from the preview images of the different compositions displayed along with the captured image, correct a resolution of the selected preview image into a high resolution and display.

According to an embodiment of the present disclosure, the controller may perform control to, when at least one preview image is selected from the preview images of the different compositions, vary a composition of the captured image by reflecting the selected preview image and display.

According to an embodiment of the present disclosure, the controller may select at least one preview frame for association with the captured image among the plurality of inputted preview frames according to at least one of a variation in a motion speed of the electronic device, a variation in a motion direction of the electronic device, a variation in a binary large object (BLOB), or a variation in processing information between the plurality of preview frames.

According to an embodiment of the present disclosure, the controller may select a preview frame inputted at a set time period as a preview frame for association with the captured image.

Figure 3:
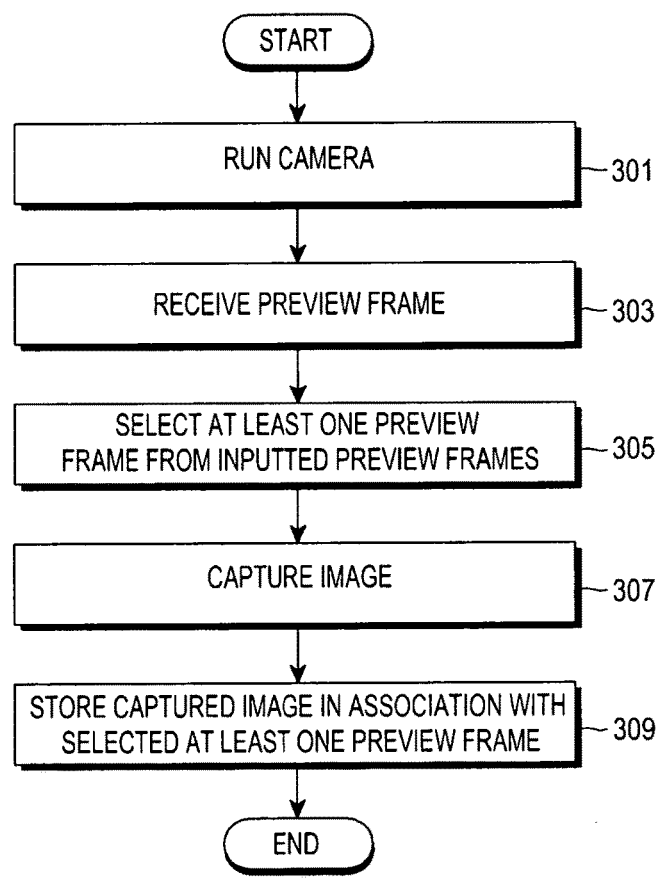
FIG. 3 is a flowchart of an operational procedure of an electronic device according to an embodiment of the present disclosure.

FIG. 3 is a flowchart of an operational procedure of an electronic device according to an embodiment of the present disclosure.

Referring to FIG. 3, the electronic device (e.g., the electronic device 101 of FIG. 1) runs the camera (e.g., the camera included in the camera module of FIG. 2) to operate the same in a preview mode in step 301.

Figure 4:
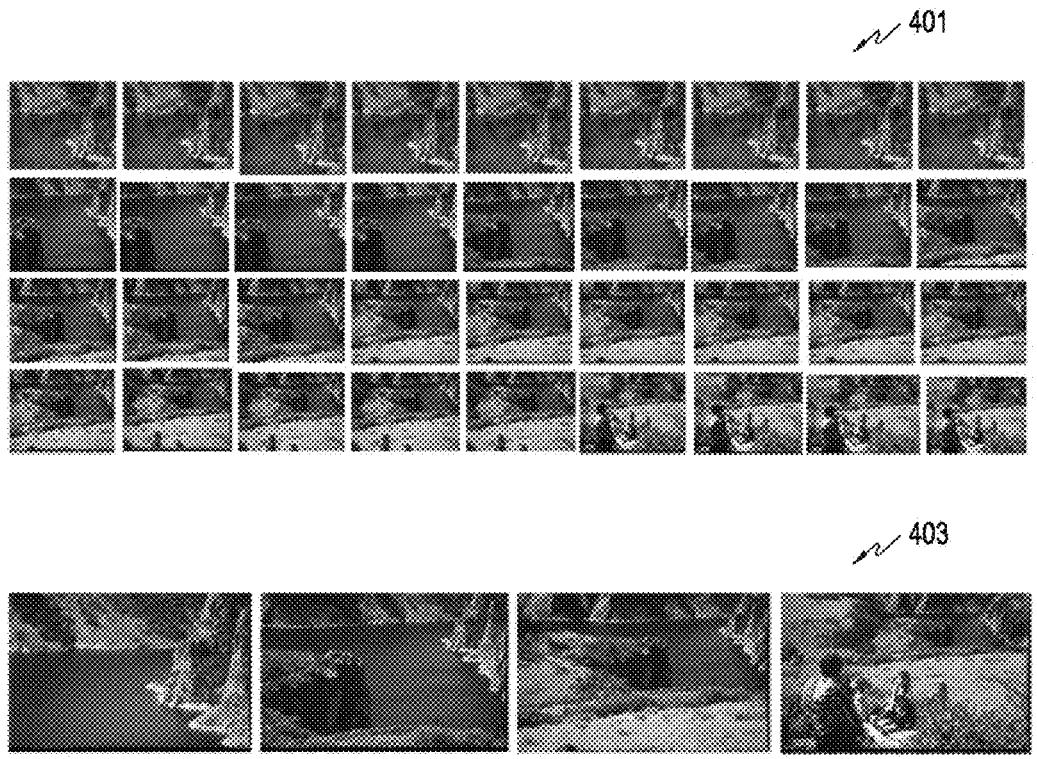
FIG. 4 is a view illustrating examples of preview frames inputted through a camera of an electronic device according to an embodiment of the present disclosure.

In step 303, the electronic device receives a preview image including a plurality of preview frames through the camera operating in the preview mode and stores the plurality of inputted preview frames in a temporary memory device (e.g., the first storage unit 231 of FIG. 2). According to an embodiment of the present disclosure, the electronic device may receive the plurality of preview frames 401 as shown in FIG. 4 and may display the plurality of inputted preview frames 401 on the screen of the display module (e.g., the display module 241 of FIG. 2). Further, upon storing the plurality of preview frames, the electronic device may store additional information for performing one of generating, processing, and displaying images as well as the image data. The additional information may include, e.g., image metadata (e.g., date (time) of image capturing or correction, image capturing scheme, focal length, aperture value, shutter speed, whether to use flash or not, exposure sensitivity, format information, or image processing information (e.g., at least one of edge, block, or scaling information), resolution, brightness, or size), or ambient context information (e.g., at least one of the creator, location, sound, movement, vibration, smell, user log information as per context recognition, ambient beacon information, camera information, image association information, image retaining information, or image history information). The electronic device may temporarily store the plurality of preview frames in a ring buffer-type first storage unit before switching to an image capturing mode, and when preview frames exceeding the buffer capacity are inputted, remove the first stored preview frame, and store the inputted preview frame.

In step 305, the electronic device selects at least one of the inputted preview frames. According to an embodiment of the present disclosure, as shown in FIG. 4, the electronic device extracts at least one preview frame (e.g., a key frame 403) from preview frames 401 inputted periodically or a frame selection condition as per motion-related information and stores the extracted preview frame (e.g., the key frame 403) in a separate storage area (e.g., the second storage area) of the first storage unit. Further, the electronic device may switch to an image capturing mode, and upon receiving the captured image, may extract at least one preview frame (e.g., the key frame) 403 among the preview frames 401 stored in the storage unit.

Figure 5:
FIG. 5 is a view illustrating an example of an image captured by an electronic device according to an embodiment of the present disclosure.

In step 307, the electronic device switches to the image capturing mode to perform image capturing through the camera, and in step 309, the electronic device stores the captured image associated with the selected at least one preview frame. According to an embodiment of the present disclosure, upon receiving the image captured by the camera, the electronic device selects pre-stored key frames or at least one of the pre-stored key frames and stores the stored key frames or selected at least one key frame associated with the captured image in the main memory device (e.g., the second storage 233 of FIG. 2). Further, the electronic device, as it receives the captured image, stores at least one preview frame selected from the preview frames stored in the first storage unit associated with the captured image. Further, as shown in FIG. 5, the electronic device may receive and store an image obtained by magnify-capturing the preview frame 501 currently inputted and may extract the preview frame 501 inputted immediately before the magnify-capturing as the key frame, and may store the captured image associated with the extracted preview frame 501.

According to an embodiment of the present disclosure, a method for processing an image by an electronic device may comprise selecting at least one preview frame from a plurality of preview frames inputted through an image capturing device interworking with the electronic device, receiving an image captured through the image capturing device according to an image capturing request, and storing the captured image and the selected at least one preview frame in association with each other.

According to an embodiment of the present disclosure, the method may further comprise temporarily storing the plurality of preview frames in a temporary memory device.

According to an embodiment of the present disclosure, the selected at least one frame may be stored in a main memory device in association with the captured image.

According to an embodiment of the present disclosure, the method may further comprise displaying the captured image along with the selected at least one frame on a display unit.

According to an embodiment of the present disclosure, the method may further comprise generating the selected at least one preview frame as a thumb image and displaying the generated thumb image along with the captured image.

According to an embodiment of the present disclosure, displaying the captured image along with the selected at least one frame may include, when a motion speed of the electronic device is smaller than a set value, matching preview frames selected from the plurality of preview frames, generating the matched preview frames as a panorama-type preview image, and displaying the panorama-type preview image along with the captured image.

According to an embodiment of the present disclosure, displaying the captured image along with the selected at least one frame may include, when the motion speed of the electronic device is not less than a set value, displaying at least one preview frame selected from the plurality of preview frames as a preview image of at least one of a still image or a video image and displaying the generated preview image along with the captured image.

According to an embodiment of the present disclosure, displaying the captured image along with the selected at least one frame may include generating preview frames selected according to a variation in a motion angle of the electronic device as preview images of different compositions and displaying the generated preview image along with the captured image.

According to an embodiment of the present disclosure, displaying the captured image along with the selected at least one frame may include, when at least one preview image is selected from the preview images of the different compositions displayed along with the captured image, correcting a resolution of the selected preview image into a high resolution and displaying.

According to an embodiment of the present disclosure, displaying the captured image along with the selected at least one frame may include, when at least one preview image is selected from the preview images of the different compositions, varying a composition of the captured image by reflecting the selected preview image and displaying.

According to an embodiment of the present disclosure, selecting the at least one preview frame from the plurality of preview frames may include receiving motion-related information sensing a motion of the electronic device while the preview frames are inputted and selecting the at least one preview frame based on the received motion-related information.

According to an embodiment of the present disclosure, selecting the at least one preview frame from the plurality of preview frames may include identifying a variation in a motion angle of the electronic device and selecting at least one preview frame inputted at a time when the motion angle is varied.

According to an embodiment of the present disclosure, the at least one preview frame may be selected from the plurality of inputted preview frames according to at least one of a variation in a motion speed of the electronic device, a variation in a motion direction of the electronic device, a variation in a binary large object (BLOB) of a database storing the preview image data, or a variation in processing information between the plurality of preview frames.

According to an embodiment of the present disclosure, selecting the at least one preview frame from the plurality of preview frames may include selecting a preview frame inputted at a set time period as a preview frame for association with the captured image.

Figure 6:
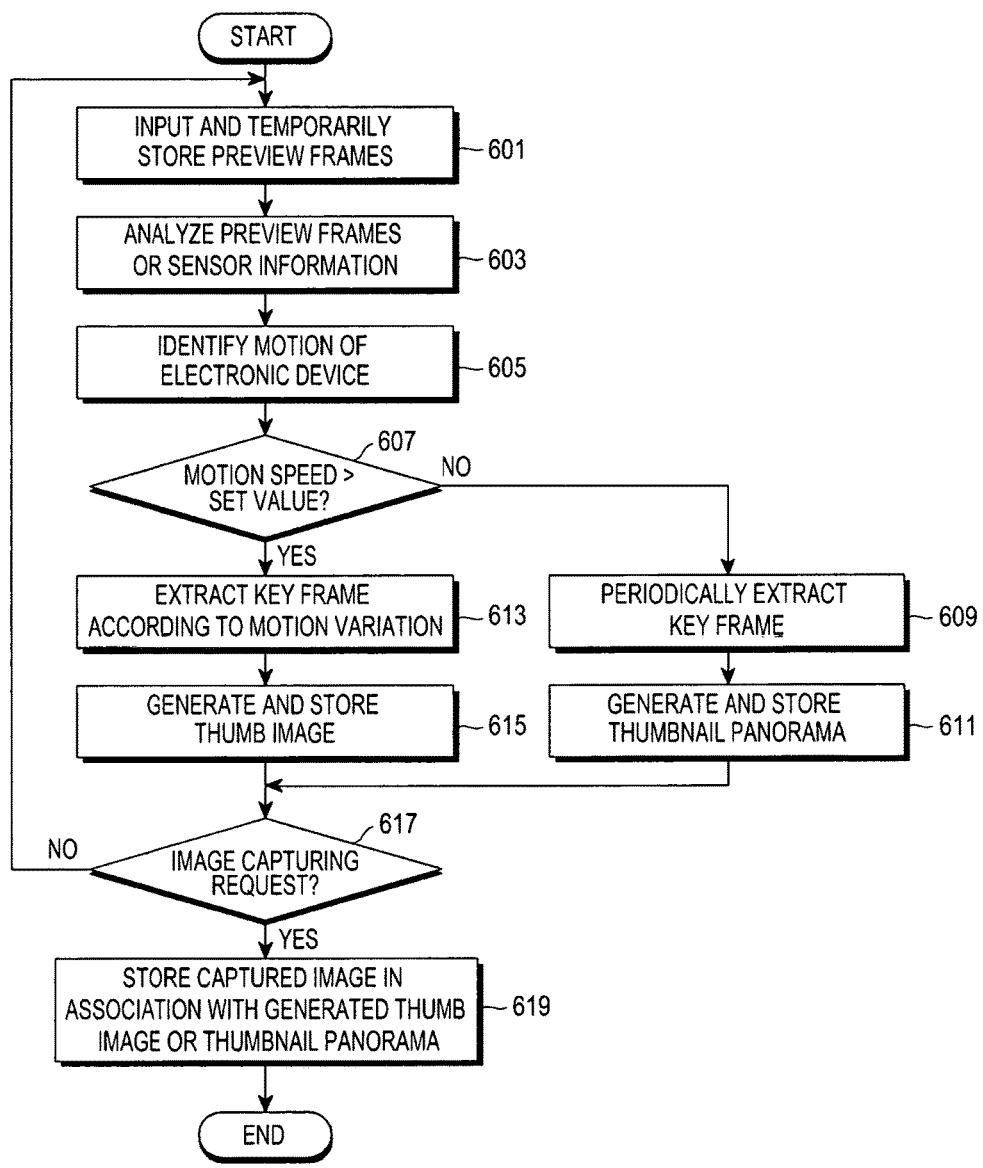
FIG. 6 is a flowchart of an operational procedure of an electronic device according to an embodiment of the present disclosure.

FIG. 6 is a flowchart of an operational procedure of an electronic device according to an embodiment of the present disclosure.

Referring to FIG. 6, in step 601, as the camera (e.g., the camera module 221 of FIG. 1) runs, the electronic device (e.g., the electronic device 101 of FIG. 1) receives a plurality of preview frames through the camera in the preview mode and temporarily stores the inputted preview frames in a temporary memory device (e.g., the first storage unit 231 of FIG. 1).

In step 603, the electronic device analyzes the inputted preview frames and analyzes sensor information (e.g., the motion-related information of the electronic device) gathered through various sensors (e.g., the sensor module 223 of FIG. 2).

In step 605, the electronic device identifies the movement of the electronic device through the result of the analysis. According to an embodiment of the present disclosure, the electronic device may identify at least one of a motion speed, a motion direction, or a motion angle based on the motion-related information to identify whether it moves in a left or right direction or upper or lower direction at a predetermined speed, or whether the composition varies.

In step 607, the electronic device compares the motion speed with a set value. When as a result of the comparison the motion speed is less than the set value, since the speed of moving the camera is slow, the electronic device determines that the amount of motion is small. Accordingly, in step 609, the electronic device extracts the key frames from a plurality of preview frames inputted periodically.

In step 611, the electronic device matches the extracted key frames to generate a thumbnail panorama with the matched key frames and stores the generated thumbnail panorama.

When as a result of the comparison in step 607 the motion speed is greater than or equal to the set value, since the speed of moving the camera is fast, the electronic device may determine that the amount of motion is large. Accordingly, in step 613, the electronic device extracts the key frames according to the motion variation. According to an embodiment of the present disclosure, the key frames may be extracted through comparison in at least one of image data or additional information between the inputted preview frames. The electronic device may identify a variation in the image data (e.g., at least one of a variation in average brightness information, a variation in the motion vector, or a variation in the BLOB information) using image processing information (e.g., block information (B field information)) and may extract at least one key frame according to a result of the identification.

In step 615, the electronic device generates the extracted at least one key frame as a thumb image (e.g., still image or video image) and stores the generated thumb image.

In step 617, the electronic device determines whether there is a user's request for image capturing. As a result of the determination, when receiving the captured image through the camera according to the image capturing request, the electronic device stores the received captured image and the generated thumb image or thumbnail panorama in association with each other in the main memory device in step 619.

According to an embodiment of the present disclosure, when receiving the user's request to display the captured image, the electronic device may display the captured image along with the associated thumb image or thumbnail panorama.

Further, although in the operational procedure of FIG. 6 at least one key frame is selected from among the plurality of preview frames inputted periodically or motion variation, according to an embodiment of the present disclosure, the electronic device may extract at least one key frame from among the plurality of preview frames stored in the temporary storage device upon switching to the image capturing mode, i.e., upon reception of the captured image.

Figure 7:
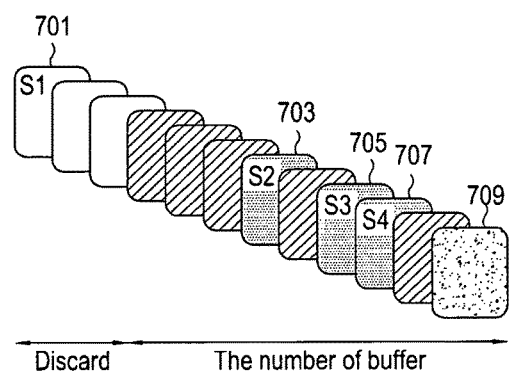
FIG. 7 is a view illustrating an example of an operation of selecting a preview frame by an electronic device according to an embodiment of the present disclosure.
Figure 8:
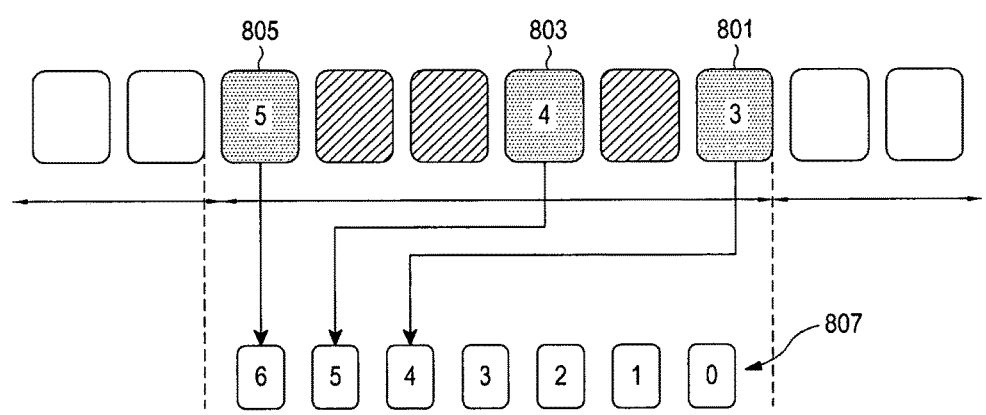
FIG. 8 is a view illustrating an example of an operation of selecting a preview frame by an electronic device according to an embodiment of the present disclosure.

FIG. 7 is a view illustrating an example of an operation of selecting a preview frame by an electronic device according to an embodiment of the present disclosure. FIG. 8 is a view illustrating an example of an operation of selecting a preview frame by an electronic device according to an embodiment of the present disclosure.

Referring to FIG. 7, the electronic device may temporarily store a plurality of preview frames inputted through the camera in the temporary memory device (e.g., the first storage unit 231 of FIG. 2). The electronic device may select at least one preview frame (e.g., at least one of S1 frame 701, S2 frame 703, S3 frame 705, or S4 frame 707) among a plurality of frames stored in the temporary memory device and include identification information in the selected at least one preview frame according to the selection. Referring to FIG. 7, when a new preview frame is stored, the preview frames may be discarded in the order inputted (e.g., first in, first out (FIFO)) according to the capacity of the buffer. Further, when receiving the captured image (or taken image) 709, the electronic device may extract at least one selected preview frame and store in the main memory device (e.g., the second storage unit 233 of FIG. 2) in association with the captured image.

Referring to FIG. 8, the electronic device may periodically extract at least one key frame (e.g., the preview frame 801, 803, or 805) from among the plurality of preview frames temporarily stored in the temporary memory device (e.g., the first storage unit 231 of FIG. 2) and may temporarily store the at least one extracted key frame 801, 803, or 805 in a separate storage area 807 of the first storage unit, as, e.g., the fourth, fifth, or sixth selected key frame in the separate storage area 807.

Figure 9:
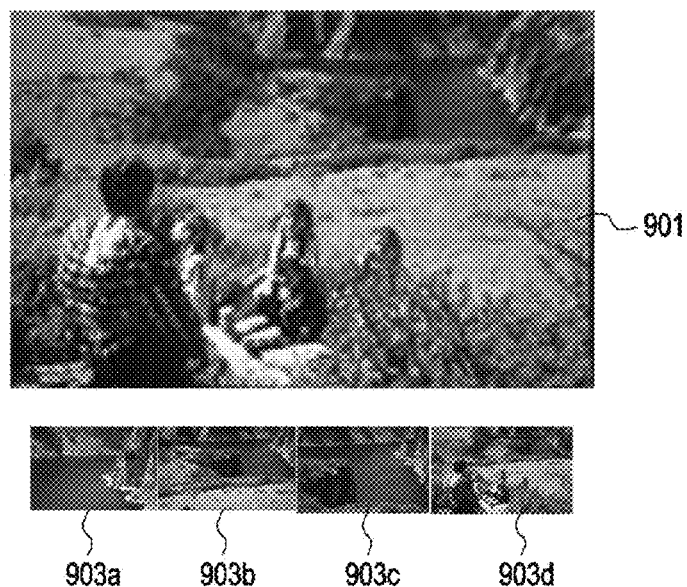
FIG. 9 is a view illustrating an example of an image displayed on an electronic device according to an embodiment of the present disclosure.
Figure 10:
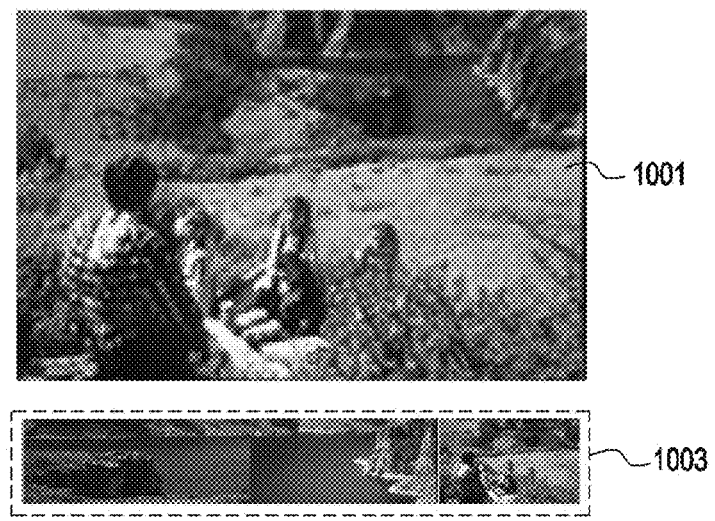
FIG. 10 is a view illustrating an example of an image displayed on an electronic device according to an embodiment of the present disclosure.

Although in the operational procedure of FIG. 6 the preview image for at least one key frame associated with the captured image according to the motion speed is generated and displayed in the display format, e.g., as at least one of the thumb image or thumb panorama, the preview image may be generated in predetermined display formats according to various embodiments. In step 615 of FIG. 6, the electronic device may display the plurality of extracted key frames as image-type thumb image or video image-type thumb images 903a, 903b, 903c, and 903d and display the captured image 901 along with the generated thumb images 903a, 903b, 903c, and 903d on the display screen, as shown in FIG. 9. Further, in step 611 of FIG. 6, the electronic device may match the plurality of extracted key frames to generate a panorama-type thumbnail panorama 1003 and may display the generated thumbnail panorama 1003 along with the captured image 1001 on the display screen, as shown in FIG. 10.

Although in the operational procedure of FIG. 6, the preview image is generated and stored as the thumb image, according to an embodiment of the present disclosure, the preview image may be generated in at least one display format among the extracted key frames (still preview image), a plurality of key frames (video preview image), preview image using an animation effect, preview image including a sound, or preview image having a slide function.

Figure 11:
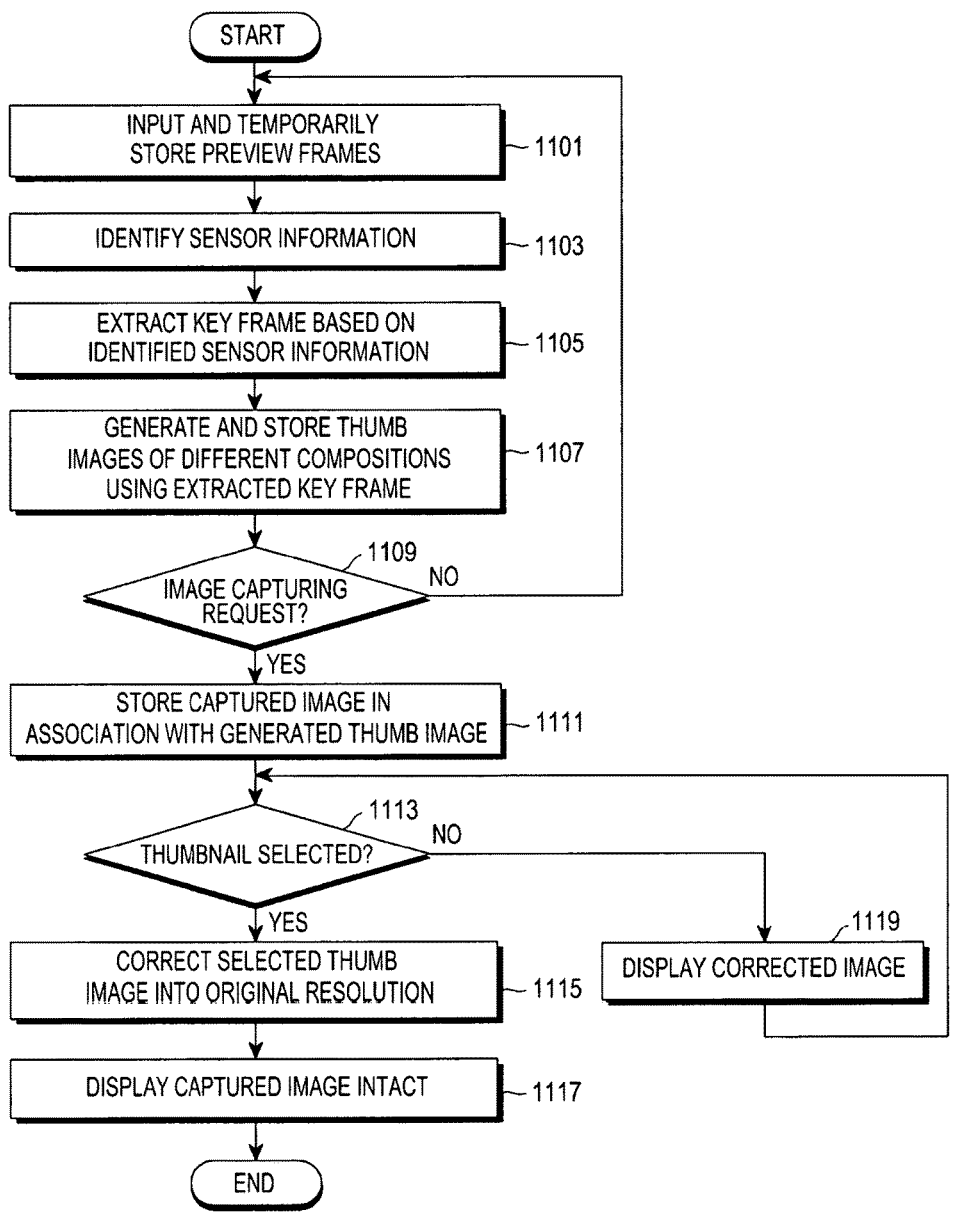
FIG. 11 is a flowchart of an operational procedure of an electronic device according to an embodiment of the present disclosure.

FIG. 11 is a flowchart of an operational procedure of an electronic device according to an embodiment of the present disclosure.

Referring to FIG. 11, in step 1101, as the camera (e.g., the camera module 221 of FIG. 1) runs, the electronic device (e.g., the electronic device 101 of FIG. 1) receives a plurality of preview frames through the camera in the preview mode and temporarily stores the inputted preview frames in a temporary memory device (e.g., the first storage unit 231 of FIG. 1).

In step 1103, the electronic device analyzes the inputted preview frames and identifies sensor information (e.g., the motion-related information of the electronic device) gathered through various sensors (e.g., the sensor module 223 of FIG. 2).

In step 1105, the electronic device extracts at least one preview frame (e.g., key frame) among the plurality of inputted preview frames based on the identified sensor information. According to an embodiment of the present disclosure, the electronic device may identify motion-related information (e.g., a variation in the motion angle) included in the sensor information to extract different compositions of key frames according to the variation in angle.

In step 1107, the electronic device generates different compositions of thumb images using the extracted key frames and temporarily stores the generated thumb images. According to an embodiment of the present disclosure, the electronic device may skip step 1107. In other words, the electronic device may include identification information according to the selection of extracted key frames without processing into other image forms or store the extracted key frames, i.e., the different compositions of preview images in a separate storage area.

Figure 12:
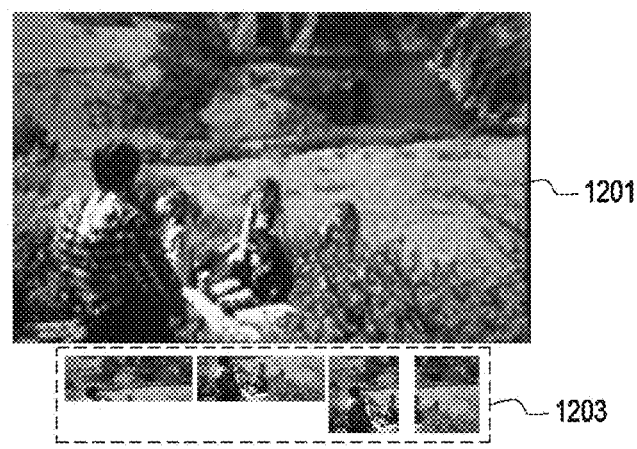
FIG. 12 is a view illustrating an example of an image displayed on an electronic device according to an embodiment of the present disclosure.
Figure 13:
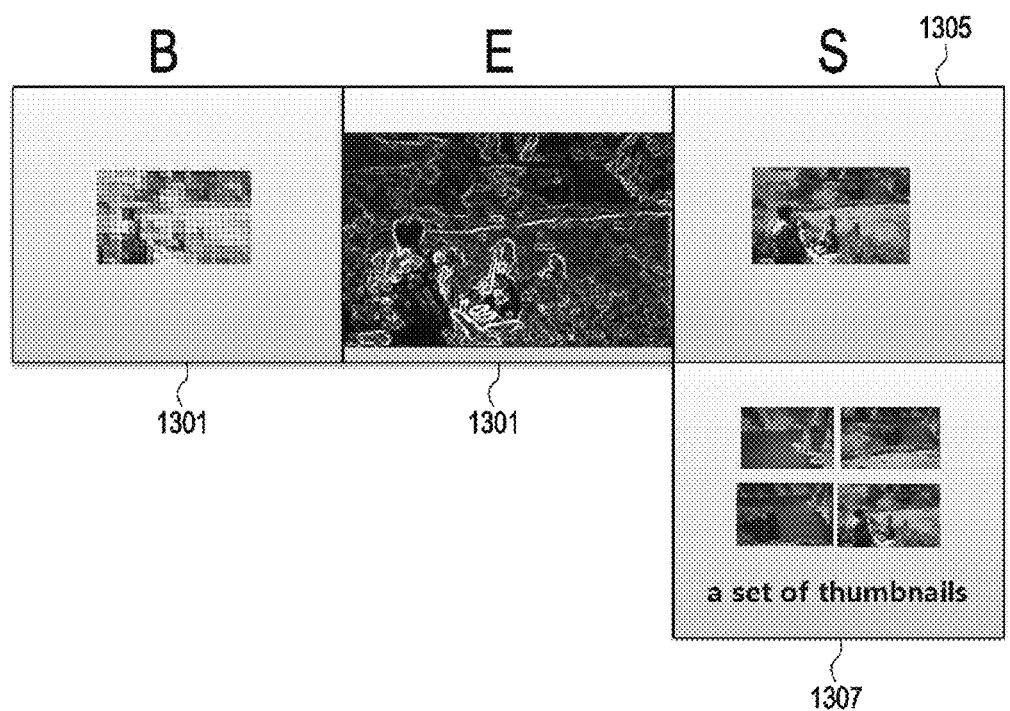
FIG. 13 is a view illustrating an example of an image displayed on an electronic device according to an embodiment of the present disclosure.

In step 1109, the electronic device determines whether there is a user's request for image capturing. As a result of the determination, when receiving the captured image through the camera according to the image capturing request, the electronic device stores in the main memory device (e.g., the second storage unit 233 of FIG. 2) the captured image and the generated thumb image associated with each other in step 1111. Further, the electronic device displays the captured image along with the associated thumb image according to the user's request to display the image. According to an embodiment of the present disclosure, the electronic device may display the different compositions of thumb images 1203 along with the captured image 1201 on the display screen as shown in FIG. 12. As shown in FIG. 13, the electronic device stores the information (B field information) of each block in the block (B) field 1301 for the frame of the high-resolution captured image, the information (E field information) of the edge (E) field 1303, or information (S field information) of scaling (S) field 1305, and it stores the at least one extracted key frame (e.g., the thumb images) 1307 associated with the S field 1305.

When there is no image capturing request as a result of the determination in step 1109, the electronic device continuously performs steps 1101 through step 1107.

In step 1113, the electronic device determines whether at least one thumbnail is selected from among the displayed thumb images. Unless the electronic device selects the displayed thumb image in step 1113 as the result of determination, the electronic device displays the captured image as it is in step 1119 and then perform step 1113. When selecting at least one thumb image from the displayed thumb images in step 1113 as the result of determination, the electronic device performs step 1115.

In step 1115, the electronic device restores the selected thumb image into the original resolution, i.e., change the resolution of the captured image to correct the image, and displays the corrected image in step 1117. According to an embodiment of the present disclosure, the electronic device may correct the selected thumb image into the original resolution using, e.g., the super resolution method. The super resolution method is a technique capable of correcting low-quality target images into high-quality images using a high-quality reference image. The super resolution method is a method estimating the pixel value by the probability and statistics of mathematical methodology such as the Markov random function (MRF) model. Methods for correcting low-quality images into high-quality images other than the super resolution method may apply to correct images.

Figure 14:
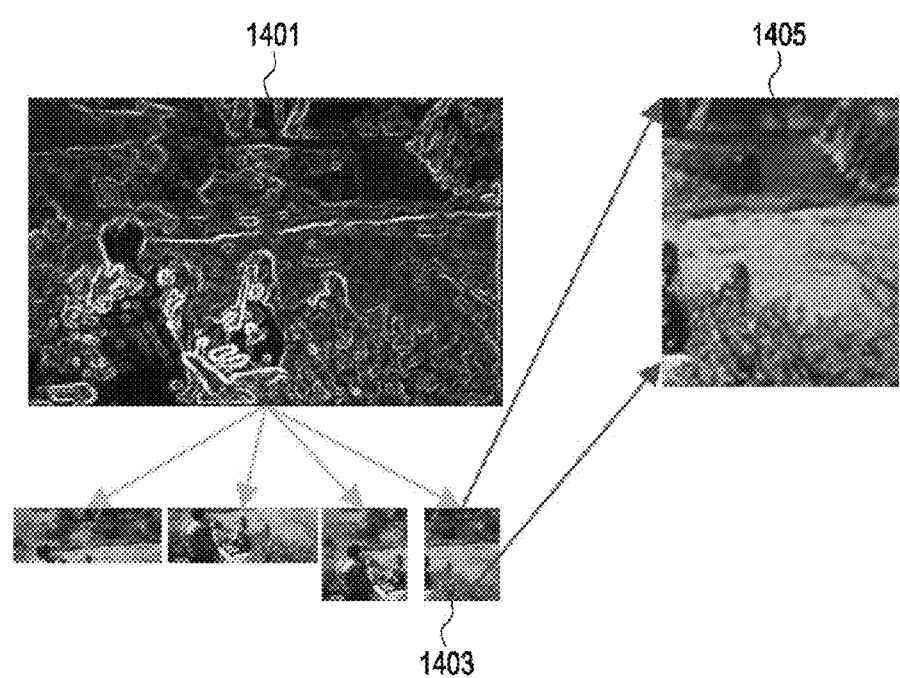
FIG. 14 is a view illustrating an example of an image displayed on an electronic device according to an embodiment of the present disclosure.

Further, according to an embodiment of the present disclosure, as shown in FIG. 14, the electronic device may correct the resolution of the selected low-resolution key frame (e.g., the thumb image) 1403 into high resolution using the information (E field information) of the edge (E) field 1303 for the frame of the high-resolution captured image and display the high-resolution corrected image 1405.

Further, according to an embodiment of the present disclosure, in step 1117, the electronic device may display only the corrected image, display the corrected image along with the captured image, display the corrected image of another composition along with the captured image, or change the composition of the captured image by reflecting the corrected image to the captured image and display.

After the operational procedures of FIG. 3, 6, or 11, the electronic device may display at least one preview frame (e.g., key frame) among the plurality of preview frames along with the captured image on the display screen in various display formats (image format).

Figure 15A:
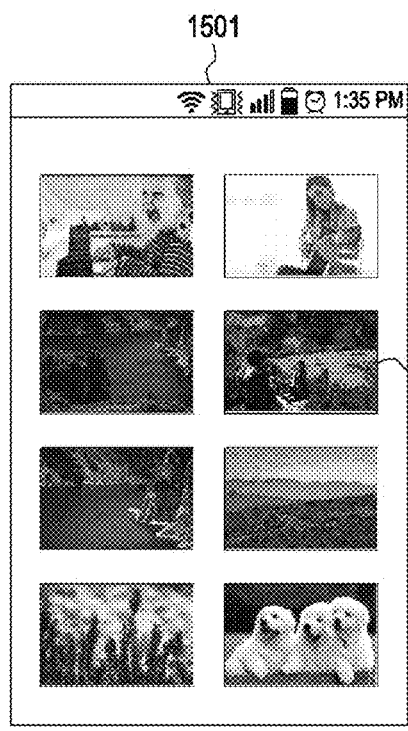
FIGS. 15A and 15B are views illustrating an example of an image displayed on an electronic device according to an embodiment of the present disclosure.
Figure 15B:
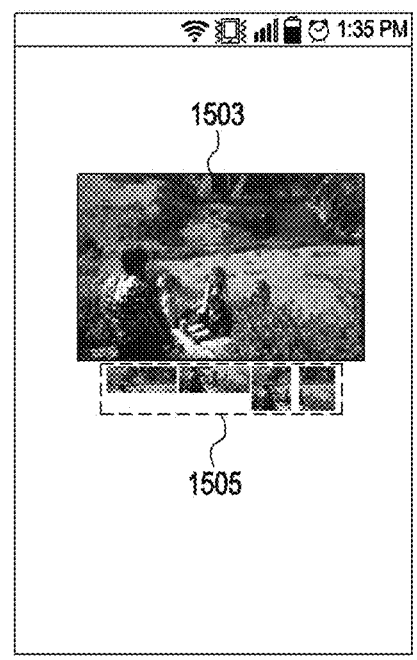
Figure 16:
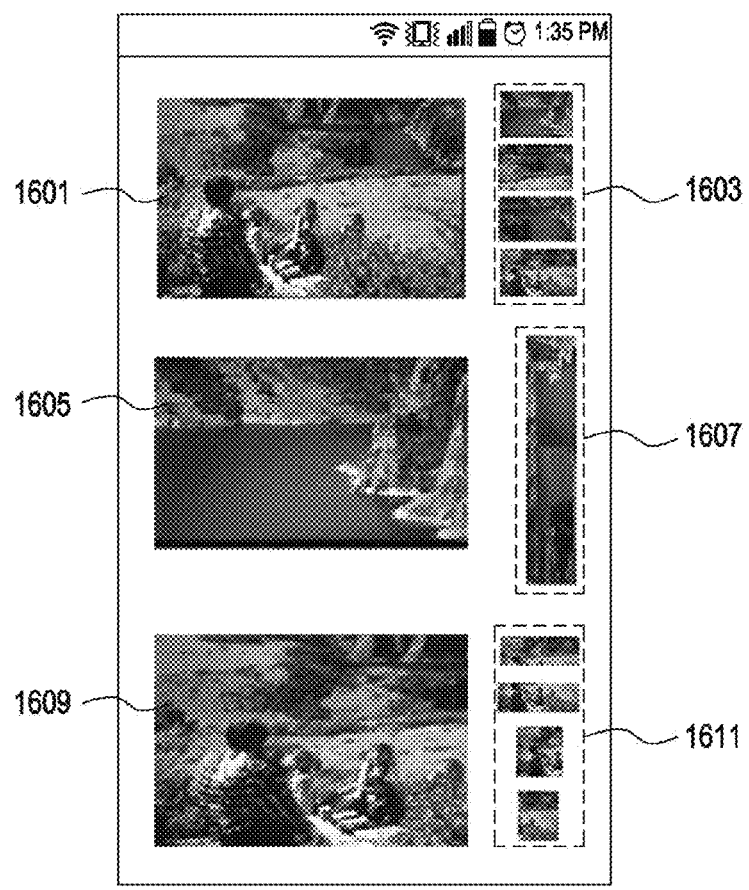
FIG. 16 is a view illustrating an example of an image displayed on an electronic device according to an embodiment of the present disclosure.

Referring to FIG. 15A, according to an embodiment of the present disclosure, the electronic device may run an image display-related application to display the captured images included in the album on the display screen 1501. When the user selects a particular captured image 1503 from the captured images displayed on the display screen 1501, the electronic device may display the selected captured image 1503 along at least one preview frame (e.g., thumb image) 1505 selected from the plurality of preview frames, as shown in FIG. 15B. When at least one captured image (e.g., the captured image 1503) of the captured images displayed on the display screen 1501 includes at least one preview frame (e.g., the thumb image) or is associated with at least one preview frame, the electronic device may differently display on the screen. For example, the electronic device may display at least one preview frame and unassociated captured image to be distinguished from each other by displaying the captured image including the at least one preview frame distinctively on a separate area or displaying a particular symbol or varying and displaying the image display form. Further, referring to FIG. 16, according to an embodiment of the present disclosure, the electronic device may run the image display-related application to display the captured images 1601, 1605, or 1609 included in the album while correspondingly displaying the associated preview frames (e.g., thumb images) 1603, 1607, or 1611 on an area of each of the captured images 1601, 1605, or 1609.

The captured images may be displayed together with at least one associated preview frame in other various display forms than what has been described above. According to an embodiment of the present disclosure, the electronic device may display the captured image and display the associated preview frames in the form of overlapping the displayed captured image. Upon receiving the user's particular input (e.g., a touch on the area where the captured image is displayed), the electronic device may display the preview frames associated with the captured image on a set area adjacent to the captured image. Further, when receiving again the user's particular input (e.g., a touch), the electronic device may display again the associated preview frames to overlap the captured image or display a particular symbol on the captured image while allowing the preview frames displayed on the set area to be not shown on the screen.

Figure 17:
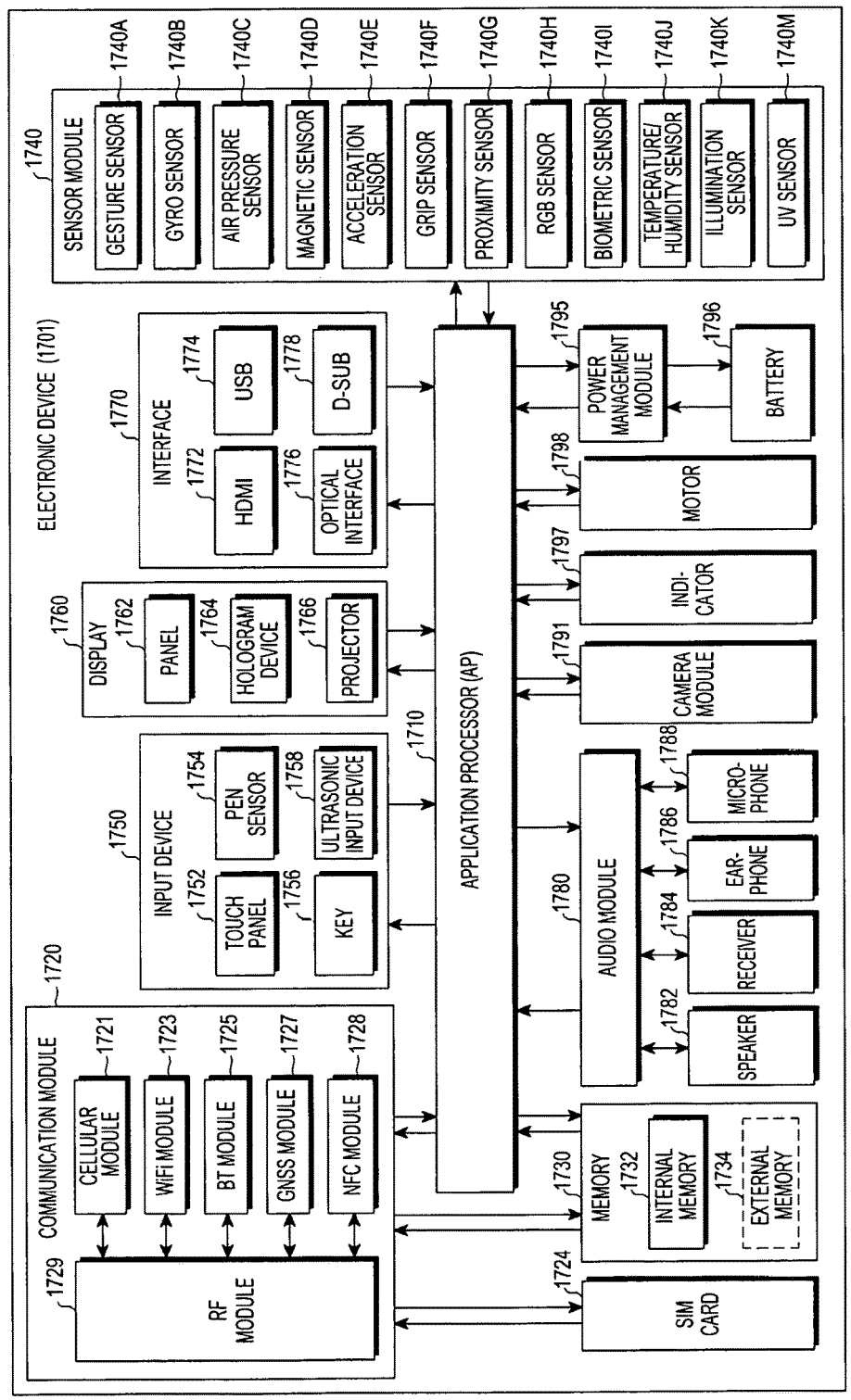
FIG. 17 is a block diagram illustrating an electronic device according to an embodiment of the present disclosure.

FIG. 17 is a block diagram illustrating an electronic device 1701 according to an embodiment of the present disclosure. The electronic device 1701 may include the whole or part of the configuration of the electronic device 101 shown in FIG. 1. The electronic device 1701 may include one or more processors (e.g., application processors (APs)) 1710, a communication module 1720, a subscriber identification module (SIM) 1724, a memory 1730, a sensor module 1740, an input device 1750, a display 1760, an interface 1770, an audio module 1780, a camera module 1791, a power management module 1795, a battery 1796, an indicator 1797, and a motor 1798.

The processor 1710 may control multiple hardware and software components connected to the processor 1710 by running an operating system or application programs, and the processor 210 may process and compute various data. The processor 1710 may be implemented in, e.g., a system on chip (SoC). According to an embodiment of the present disclosure, the processor 1710 may further include a graphic processing unit (GPU) and/or an image signal processor. The processor 1710 may include at least some (e.g., a cellular module 1721) of the components shown in FIG. 17. The processor 1710 may load a command or data received from at least one of other components (e.g., a non-volatile memory) on a volatile memory, process the command or data, and store various data in the non-volatile memory.

The communication module 1720 may have the same or similar configuration to the communication interface 170 of FIG. 1. The communication module 1720 may include, e.g., the cellular module 1721, a Wi-Fi module 1723, a Bluetooth module 1725, a GNSS module 1727 (e.g., a GPS module, a Glonass module, a Beidou module, or a Galileo module), an NFC module 1728, and a radio frequency (RF) module 1729.

The cellular module 1721 provides voice call, video call, text, or Internet services through a communication network. The cellular module 1721 may perform identification or authentication on the electronic device 1701 in the communication network using the SIM 1724 (e.g., the SIM card). According to an embodiment of the present disclosure, the cellular module 1721 may perform at least some of the functions providable by the processor 1710. The cellular module 1721 may include a communication processor (CP).

The Wi-Fi module 1723, the Bluetooth module 1725, the GNSS module 1727, or the NFC module 1728 may include a processor for processing data communicated through the module. According to an embodiment of the present disclosure, at least some (e.g., two or more) of the cellular module 1721, the Wi-Fi module 1723, the Bluetooth module 1725, the GNSS module 1727, or the NFC module 1728 may be included in a single integrated circuit (IC) or an IC package.

The RF module 1729 communicates data, e.g., communication signals such as RF signals. The RF module 1729 may include, e.g., a transceiver, a power amplifier module (PAM), a frequency filter, a low noise amplifier (LNA), or an antenna. According to an embodiment of the present disclosure, at least one of the cellular module 1721, the Wi-Fi module 1723, the Bluetooth module 1725, the GNSS module 1727, or the NFC module 1728 may communicate RF signals through a separate RF module.

The SIM 1724 may include a card including a subscriber identification module and/or an embedded SIM, and may contain unique identification information (e.g., an integrated circuit card identifier (ICCID) or subscriber information (e.g., an international mobile subscriber identity (IMSI)).

The memory 1730 (e.g., the memory 130) may include, e.g., an internal memory 1732 or an external memory 1734. The internal memory 1732 may include at least one of, e.g., a volatile memory (e.g., a dynamic random access memory (DRAM), a static RAM (SRAM), a synchronous dynamic RAM (SDRAM), etc.) or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 1734 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 1734 may be functionally and/or physically connected with the electronic device 1701 via various interfaces.

The sensor module 1740 measures a physical quantity or detects a motion state of the electronic device 1701, and the sensor module 1740 may convert the measured or detected information into an electrical signal. The sensor module 1740 may include at least one of, e.g., a gesture sensor 1740A, a gyro sensor 1740B, an air pressure sensor 1740C, a magnetic sensor 1740D, an acceleration sensor 1740E, a grip sensor 1740F, a proximity sensor 1740G, a color sensor 1740H such as a red-green-blue (RGB) sensor, a bio sensor 1740I, a temperature/humidity sensor 1740J, an illumination sensor 1740K, or an ultra violet (UV) sensor 1740M. Additionally or alternatively, the sensing module 1740 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 1740 may further include a control circuit for controlling at least one or more of the sensors included in the sensing module. According to an embodiment of the present disclosure, the electronic device 1701 may further include a processor configured to control the sensor module 1740 as part of the processor 1710 or separately from the processor 1710, and the electronic device 1701 may control the sensor module 1740 while the processor 1710 is in a sleep mode.

The input unit 1750 may include, e.g., a touch panel 1752, a (digital) pen sensor 1754, a key 1756, or an ultrasonic input device 1758. The touch panel 1752 may use at least one of capacitive, resistive, infrared, or ultrasonic methods. The touch panel 1752 may further include a control circuit. The touch panel 1752 may further include a tactile layer and may provide a user with a tactile reaction.

The (digital) pen sensor 1754 may include a part of a touch panel or a separate sheet for recognition. The key 1756 may include a physical button, optical key or key pad. The ultrasonic input device 1758 may sense an ultrasonic wave generated from an input tool through a microphone (e.g., the microphone 1788) to identify data corresponding to the sensed ultrasonic wave.

The display 1760 may include a panel 1762, a hologram device 1764, or a projector 1766. The panel 1762 may have the same or similar configuration to the display 160 of FIG. 1. The panel 1762 may be implemented to be flexible, transparent, or wearable. The panel 1762 may also be incorporated with the touch panel 1752 in a module. The hologram device 1764 may make three dimensional (3D) images (holograms) in the air by using light interference. The projector 1766 may display an image by projecting light onto a screen. The screen may be, for example, located inside or outside of the electronic device 1701. In accordance with an embodiment, the display 1760 may further include a control circuit to control the panel 1762, the hologram device 1764, or the projector 1766.

The interface 1770 may include a High Definition Multimedia Interface (HDMI) 1772, a USB 1774, an optical interface 1776, or a D-subminiature (D-sub) 1778. The interface 1770 may be included in the communication interface 170 shown in FIG. 1. Additionally or alternatively, the interface 1770 may include a Mobile High-definition Link (MHL) interface, a secure digital (SD) card/multimedia card (MMC) interface, or infrared data association (IrDA) standard interface.

The audio module 1780 converts a sound into an electric signal or vice versa, for example. At least a part of the audio module 1780 may be included in the input/output interface 150 as shown in FIG. 1. The audio module 1780 may process sound information input or output through a speaker 1782, a receiver 1784, an earphone 1786, or the microphone 1788.

The camera module 1791 may be a device for recording still images and videos, and may include, according to an embodiment of the present disclosure, one or more image sensors (e.g., front and back sensors), a lens, an image signal processor (ISP), or a flash such as an LED or xenon lamp.

The power management module 1795 manages power of the electronic device 1701. According to an embodiment of the present disclosure, the power management module 1795 may include a power management integrated circuit (PMIC), a charger IC, or a battery gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge measures an amount of remaining power of the battery 1796, a voltage, a current, or a temperature while the battery 296 is being charged. The battery 1796 may include, e.g., a rechargeable battery or a solar battery.

The indicator 1797 indicates a particular state of the electronic device 1701 or a part (e.g., the processor 1710) of the electronic device, including e.g., a booting state, a message state, or recharging state. The motor 1798 converts an electric signal to a mechanical vibration and generates a vibrational or haptic effect. Although not shown, a processing unit for supporting mobile TV, such as a GPU may be included in the electronic device 1701. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity performs the same functions as the components may do.

Figure 18:
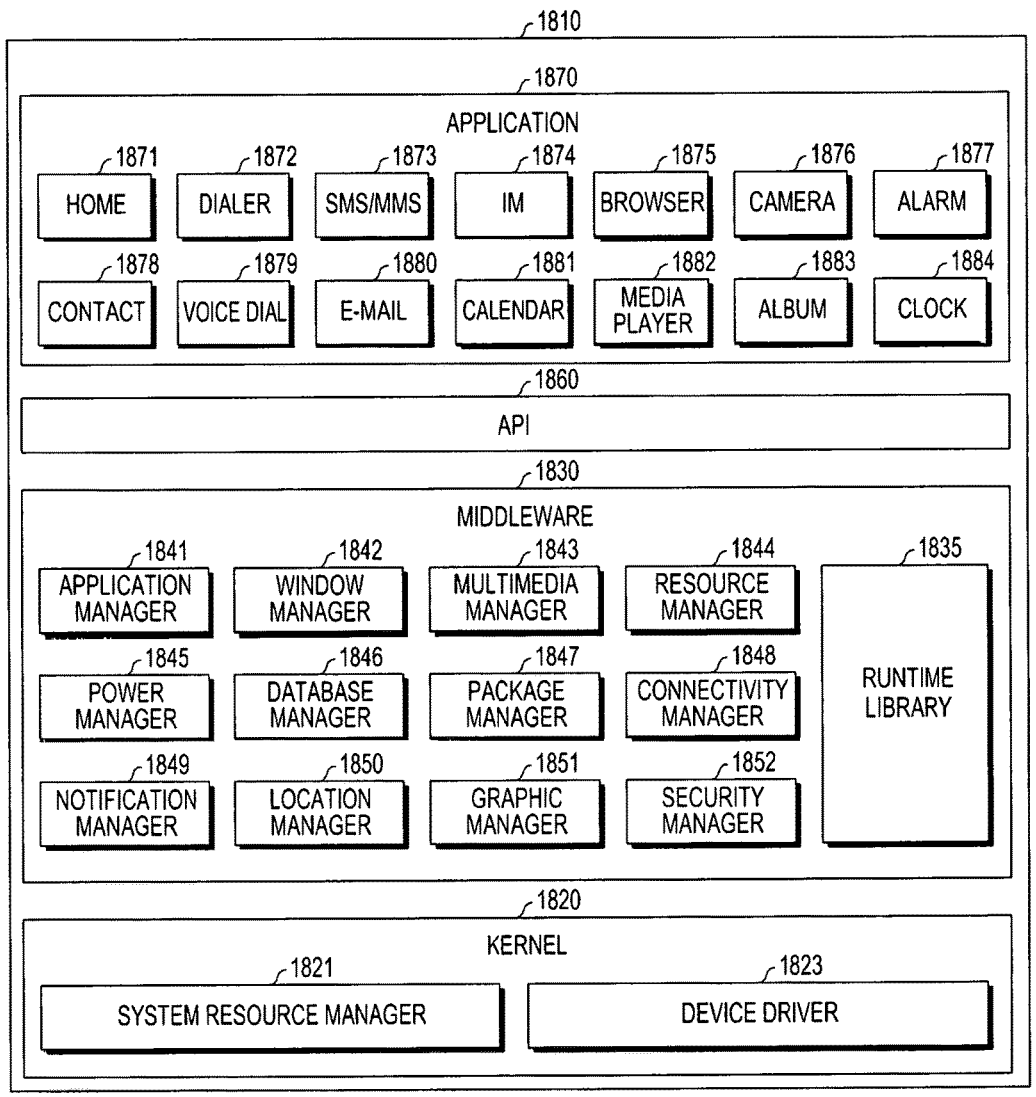
FIG. 18 is a block diagram illustrating a program module according to an embodiment of the present disclosure.

FIG. 18 is a block diagram illustrating a program module according to an embodiment of the present disclosure. The program module 1810 (e.g., the program 140) may include an operating system (OS) controlling resources related to the electronic device (e.g., the electronic device 101) and/or various applications (e.g., the applications 147) driven on the operating system. The operating system may include, e.g., Android, iOS, Windows, Symbian, Tizen, or Bada.

The program 1810 may include, e.g., a kernel 1820, middleware 1830, an application programming interface (API) 1860, and/or applications 1870. At least a part of the program module 1810 may be preloaded on the electronic device or may be downloaded from an external electronic device (e.g., the electronic devices 102 and 104 or server 106).

The kernel 1820 (e.g., the kernel 141) may include, e.g., a system resource manager 1821 and/or a device driver 1823. The system resource manager 1821 performs control, allocation, or recovery of system resources. According to an embodiment of the present disclosure, the system resource manager 1821 may include a process managing unit, a memory managing unit, or a file system managing unit. The device driver 1823 may include, e.g., a display driver, a camera driver, a Bluetooth driver, a shared memory driver, a USB driver, a keypad driver, a Wi-Fi driver, an audio driver, or an inter-process communication (IPC) driver.

The middleware 1830 provides various functions to the applications 1870 through the API 1860 so that the applications 1870 may efficiently use limited system resources in the electronic device or provide functions jointly required by applications 1870. According to an embodiment of the present disclosure, the middleware 1830 (e.g., the middleware 143) may include at least one of a runtime library 1835, an application manager 1841, a window manager 1842, a multimedia manager 1843, a resource manager 1844, a power manager 1845, a database manager 1846, a package manager 1847, a connectivity manager 1848, a notification manager 1849, a location manager 1850, a graphic manager 1851, or a security manager 1852.

The runtime library 1835 may include a library module used by a compiler in order to add a new function through a programming language while the application 1870 is being executed. The runtime library 1835 may perform input/output management, memory management, or operation on arithmetic functions.

The application manager 1841 manages the life cycle of at least one application of the applications 1870. The window manager 1842 manages GUI resources used on the screen. The multimedia manager 1843 grasps formats necessary to play various media files and uses a codec appropriate for a format to perform encoding or decoding on media files. The resource manager 1844 manages resources, such as source code of at least one of the applications 1870, memory or storage space.

The power manager 1845 may operate together with, e.g., a basic input/output system (BIOS) to manage battery or power and provide power information necessary for operating the electronic device. The database manager 1846 generates, searches, or varies a database to be used in at least one of the applications 1870. The package manager 1847 manages installation or update of an application that is distributed in the form of a package file.

The connectivity manager 1848 manages wireless connectivity, such as, e.g., Wi-Fi or Bluetooth. The notification manager 1849 displays or notifies an event, such as an incoming message, appointment, or proximity notification, of the user without interfering with the user. The location manager 1850 manages locational information on the electronic device. The graphic manager 1851 manages graphic effects to be offered to the user and their related user interface. The security manager 1852 provides various security functions necessary for system security or user authentication. According to an embodiment of the present disclosure, when the electronic device has telephony capability, the middleware 1830 may further include a telephony manager for managing voice call or video call functions of the electronic device.

The middleware 1830 may include a middleware module forming a combination of various functions of the above-described components. The middleware 1830 may provide a specified module per type of the operating system in order to provide a differentiated function. Further, the middleware 1830 may dynamically omit some existing components or add new components.

The API 1860 (e.g., the API 145) may be a set of API programming functions and may have different configurations depending on operating systems. For example, in the case of Android or iOS, one API set may be provided per platform, and in the case of Tizen, two or more API sets may be offered per platform.

The applications 1870 may include one or more applications that may provide functions such as, e.g., a home 1871, a dialer 1872, a short message service (SMS)/multimedia messaging service (MMS) 1873, an instant message (IM) 1874, a browser 1875, a camera 1876, an alarm 1877, a contact 1878, a voice dial 1879, an email 1880, a calendar 1881, a media player 1882, an album 1883, or a clock 1884, a health-care application (e.g., measuring the degree of workout or blood sugar level), or provision of environmental information (such as air pressure, moisture, or temperature information).

According to an embodiment of the present disclosure, the applications 1870 may include an information exchanging application supporting information exchange between the electronic device and an external electronic device. Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device. Further, the notification relay application may receive notification information from the external electronic device and may provide the received notification information to the user.

The device management application may perform at least some functions of an external electronic device communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the applications 1870 may include an application (e.g., a health-care application of a mobile medical device) designated according to an attribute of the external electronic device. The applications 1870 may include an application received from the external electronic device. The applications 1870 may include a preloaded application or a third party application downloadable from a server. The names of the components of the program module 1810 according to the shown embodiment may vary depending on the type of operating system.

According to an embodiment of the present disclosure, at least a part of the program module 1810 may be implemented in software, firmware, hardware, or in a combination of two or more thereof. At least a part of the programming module 1810 may be implemented (e.g., executed) by a processor (e.g., the processor 210). At least a part of the program module 1810 may include a module, program, routine, set of instructions, process, or the like for performing one or more functions.

The term "module" may refer to a unit including one of hardware, software, and firmware, or a combination thereof. The term "module" may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor, may enable the processor to carry out a corresponding function. The computer-readable storage medium may be the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components may be carried out sequentially, simultaneously, repeatedly, or heuristically. Furthermore, some of the operations may be performed in a different order, or omitted, or include other additional operation(s).

According to an embodiment of the present disclosure, there is provided a computer readable recording medium recording a program running on a computer, the program executed by a processor to enable the processor to perform the operation of selecting at least one preview frame from a plurality of preview frames inputted through an image capturing device interworking with the electronic device, receiving an image captured through the image capturing device according to an image capturing request, and storing the captured image and the selected at least one preview frame in association with each other.

The embodiments disclosed herein are provided for description and understanding of the disclosed technology and do not limit the scope of the present disclosure. Accordingly, the scope of the present disclosure should be interpreted as including all changes or various embodiments based on the technical spirit of the present disclosure.

While the present disclosure has been shown and described with reference to certain embodiments thereof, it will be understood by those skilled in the art that various changes in form and detail may be made therein without departing from the spirit and scope of the disclosure as defined by the appended claims and their equivalents.

What is claimed is:

1. An electronic device, comprising:
   a display;
   a controller configured to:
      control the display to display a preview video inputted through an image capturing device operably coupled with the electronic device;
      detect an image capturing request of a user;
      in response to detecting the image capturing request, store an image captured through the image capturing device and image data corresponding to at least one frame of the preview video, which is inputted through the image capturing device for a predetermined time prior to the image capturing request, in a memory of the electronic device; and
      the memory that stores the captured image and the image data,
      wherein a resolution of the captured image is higher than a resolution of the at least one frame.

2. The electronic device of claim 1, wherein the controller is further configured to display the captured image along with the at least one frame on the display, temporarily store frames of the preview video in a temporary memory of the memory, and store the at least one frame associated with the captured image, along with the captured image, in a main memory of the memory.

3. The electronic device of claim 1, wherein the controller is further configured to receive motion-related information of a sensed motion of the electronic device while the preview video is inputted and to display the at least one frame along with the captured image based on the received motion-related information.

4. The electronic device of claim 3, wherein the controller is further configured to identify a motion speed of the electronic device, and when the identified motion speed is less than a set value, match a plurality of frames extracted from the preview video and display the matched frames as a panorama-type preview image.

5. The electronic device of claim 3, wherein the controller is further configured to identify a motion speed of the electronic device, and when the identified motion speed is greater than or equal to a set value, display the at least one frame as a preview image of at least one type of a still image or a video image.

6. The electronic device of claim 3, wherein the controller is further configured to extract at least one frame whenever a motion angle of the electronic device is varied not less than a set angle, and display a plurality of frames extracted prior to the captured image is received as preview images of different compositions.

7. The electronic device of claim 6, wherein the controller is further configured to, when at least one preview image is extracted from the preview images of the different compositions displayed along with the captured image, correct a resolution of the extracted preview image into a high resolution and display the corrected image.

8. The electronic device of claim 6, wherein the controller is further configured to, when at least one preview image is extracted from the preview images of the different compositions, change a composition of the captured image by reflecting the extracted preview image and display the captured image.

9. The electronic device of claim 1, wherein the controller is further configured to extract a plurality of frames associated with the captured image from the preview video based on at least one of a variation in a motion speed of the electronic device, a variation in a motion direction of the electronic device, a variation in a binary large object (BLOB), or a variation in processing information between a plurality of frames of the preview video.

10. A method for processing an image by an electronic device, the method comprising:
   displaying a preview video inputted through an image capturing device operably coupled with the electronic device;
   detecting an image capturing request of a user;
   in response to detecting the image capturing request, receiving an image captured through the image capturing device and image data corresponding to at least one frame of the preview video, which is inputted through the image capturing device for a predetermined time prior to the image capturing request; and
   storing the captured image and the image data,
   wherein a resolution of the captured image is higher than a resolution of the image data corresponding to the at least one frame.

11. The method of claim 10, further comprising temporarily storing the frames of the preview video in a temporary memory; and
   displaying the captured image along with the at least one frame on a display, wherein the at least one frame is stored in a main memory in association with the captured image.

12. The method of claim 11, wherein displaying the captured image along with the at least one frame includes, when a motion speed of the electronic device is less than a set value, matching a plurality of frames extracted from the preview video, generating the matched frames as a panorama-type preview image, and displaying the panorama-type preview image along with the captured image.

13. The method of claim 11, wherein displaying the captured image along with the at least one frame includes, when the motion speed of the electronic device is greater than or equal to a set value, displaying the at least one frame as a preview image of at least one of a still image or a video image and displaying the generated preview image along with the captured image.

14. The method of claim 11, wherein displaying the captured image along with the at least one frame includes generating frames extracted according to a variation in a motion angle of the electronic device as preview images of different compositions and displaying the generated preview image along with the captured image.

15. The method of claim 14, wherein displaying the captured image along with the at least one frame includes, when at least one preview image is extracted from the preview images of the different compositions displayed along with the captured image, correcting a resolution of the extracted preview image into a high resolution and displaying the corrected image.

16. The method of claim 14, wherein displaying the captured image along with the at least one frame includes, when at least one preview image is extracted from the preview images of the different compositions, changing a composition of the captured image by reflecting the extracted preview image and displaying the captured image.

17. The method of claim 10, wherein displaying the preview video includes receiving motion-related information, sensing a motion of the electronic device while the preview video are inputted and extracting the frames based on the received motion-related information.

18. The method of claim 10, wherein displaying the preview video includes identifying a variation in a motion angle of the electronic device and displaying frames of the preview video inputted at a time when the motion angle is varied.

19. The method of claim 10, wherein the at least one frame are extracted from the preview video based on at least one of a variation in a motion speed of the electronic device, a variation in a motion direction of the electronic device, a variation in a binary large object (BLOB) of a database storing the preview image data, or a variation in processing information between a plurality of frames of the preview video.

20. A non-transitory computer readable recording medium having recorded thereon a program running on a computer, the program including executable commands executed by a processor to enable the processor to:
   display a preview video inputted through an image capturing device operably coupled with the electronic device,
   detect an image capturing request of a user;
   in response to detecting the image capturing request, receive an image captured through the image capturing device and image data corresponding to at least one frame of the preview video, which is inputted through the image capturing device for a predetermined time prior to the image capturing request, and
   store the captured image and the image data,
   wherein a resolution of the captured image is higher than a resolution of the image data corresponding to the at least one frame.

* * * * *